Patented Oct. 19, 1937

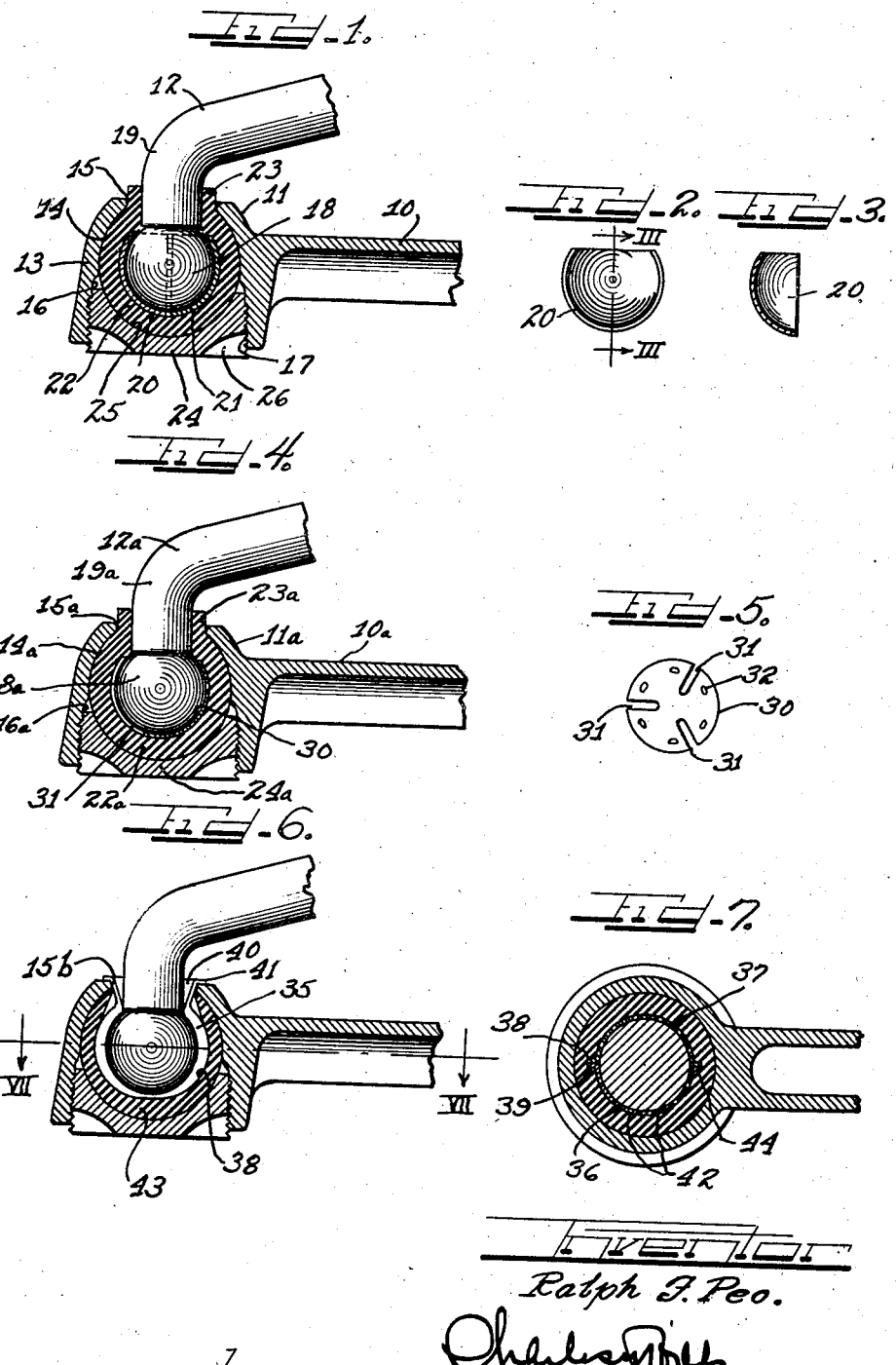

2,096,557

UNITED STATES PATENT OFFICE 2,096,557

JOINT

Ralph F. Peo, Buffalo, N. Y., assignor to Houde Engineering Corporation, Buffalo, N. Y., a corporation of New York Application September 4, 1934, Serial No. 742,549

3 Claims. (Cl. 287—90)

This invention relates to a joint and more particularly to a joint of the type adapted for use in shock absorber link assembly, drag links and the like.

In a copending application filed of even date herewith, Serial No. 743,237, there is described a joint of the same general type as that of the present invention. In the pending application a bushing of yieldable material provides the necessary amount of angular and rotary movement between the movable members of the link assembly through distortion, deformation or interparticle flow of the material of the bushing. In the case of drag links that are to be subjected to extra heavy load, I have found that it is desirable to provide an antifriction or self-lubricating bearing between the ball end of the stud and the rubber bushing. The present invention is directed to this type of joint.

It is therefore an object of this invention to provide a joint of simple and inexpensive construction that is adapted for use in connection with heavy loads.

It is a further important object of this invention to provide a novel and improved type of self-lubricating liner for use in joints of this kind.

Other and further important objects of this invention will become apparent from the following description and appended claims.

On the drawing:

Figure 1 is a fragmentary longitudinal sectional view of a joint embodying the principles of this invention, with parts shown in elevation.

Figure 2 is an elevational view of a self-lubricating liner.

Figure 3 is a sectional view taken substantially on the line III—III of Fig. 2.

Figure 4 is a fragmentary longitudinal sectional view of a joint employing a different type of self-lubricating liner.

Figure 5 is a plan view of the liner.

Figure 6 is a fragmentary longitudinal sectional view of a joint showing a still further modification.

Figure 7 is a sectional view taken substantially on the line VII—VII of Fig. 6.

As shown on the drawing:

The reference numeral 10 indicates generally a link having at each end a joint 11 for connection with a link, lever or stud 12. The joint 11 comprises an end socket member 13 and is preferably forged integrally with the link 10. Said socket 13 is provided internally with a segmental spherical surface 14 terminating at one end in a restricted circular opening 15. A cylindrical surface 16 extends from said segmental spherical surface 14 to the end of said socket and is threaded as at 17 for most of its length.

The stud 12 is provided with a ball end 18 adapted to be positioned within the socket 13, with the shank 19 of the stud extending through the restricted opening 15. In accordance with the present invention, a pair of anti-friction bearing sleeves 20 and 21 substantially enclose the ball end 18. These bearing sleeves 20 and 21 may be made of any suitable metal, such as phosphor bronze, brass or the like, impregnated with graphite or other lubricating substance.

A rubber bushing 22 surrounds the sleeve enclosed ball end 18, a collar portion 23 being provided on said bushing to snugly engage the shank 19 of the stud and to fill the space between said shank and the restricted neck 15 of the socket. Said collar 23 serves to exclude dirt and moisture from the bearing surfaces.

A closure member 24 comprising an externally threaded plug is threaded into engagement with the threads 17 of the cylindrical socket portion 16. Said closure 24 is provided with a segmental spherical surface 25 for engagement with the outer surface of the bushing 22.

In assembling the joint, the ball end 18 is moved relatively to the socket 13 so that with its shank 19 extending through the restricted opening 15, the sleeves 20 and 21 may be slipped in place and the rubber bushing 22 mounted thereon. The rubber bushings 22 are preferably molded to such size and shape as to fit snugly about the ball end 18 and also within the spherical portion 14 of the socket 13. The closure member 24 is then threaded into place to hold the bushing 22 under some slight degree of compression, at least sufficient to prevent any slippage between the outer surface of the bushing and the contacting surfaces of the socket and closure member during operation of the joint. After the closure member 24 has been threaded home, it may be locked in place by deforming a thread or two of the threaded portion 17, as by means of a prick punch inserted through slots 26 formed in the closure member for this purpose.

In Figs. 4 and 5 the general construction of the joint is the same and similar elements of the joint are indicated with the same numbers provided with a small letter $a$. A different type of self-lubricating bearing sleeve is, however, shown in this joint. The sleeve, indicated by the reference numeral 30, comprises a single piece of thin metal of segmental spherical form and provided with circumferentially extending slots 31 and apertures 32. The slots 31 provide the necessary amount of resiliency to allow the one-piece sleeve 30 to be snapped over the ball end 18a. The resiliency of the sleeve 30, as well as the compressive force of the rubber bushing 22a, holds the sleeve 30 in snug engagement with the ball end 18a. As previously described, the sleeve 30 is made of some lubricant impregnated metal so that it requires no lubrication after assembly.

In Figs. 6 and 7, a further modification of bearing sleeve is illustrated. Said sleeve, indicated generally by the reference numeral 35, comprises a pair of metal segments 36 and 37 of segmental spherical shape and provided with mating peripheral flanges 38 and 39, respectively. Each of the segments 36 and 37 is also provided with an upstanding, outwardly flared collar 40. A flange 41 on each of the collars 40 rests against the neck 15b defining the restricted opening of the socket member. The sleeve segments 36 and 37 are also provided with perforations 42.

The rubber bushing 43 is preferably molded with an inner groove or recess 44 for receiving the flanges 38 and 39. The interlocking of the flanges 38 and 39 with the groove 44 prevents any relative surface movement between the sleeve 35 and the inner surface of the rubber bushing 43.

In each type of joint, all of the relative surface movement is between the ball end 18 and the lubricated surface of the bearing sleeve 20, except for such slight movement as may occur between the surface of the shank 19 and the inner surface of the collar portion 23 of the bushing. The resistance offered to turning by the engagement of the collar 23 with the shank 19 is not objectionable in a shock absorber link assembly, but where heavy loads are placed upon the device, it is preferable to use a frictionless bearing liner as shown rather than have direct contact between the entire inner surface of the rubber bushing and the ball end.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A joint assembly comprising a housing having an opening at one end, a stud having a headed portion in said housing, a metallic shell about said headed portion and having an outwardly flared collar or neck extending through said opening, and a liner of rubber, or the like resilient material, within said housing and interposed between said shell and the inner face of the wall of said housing, said collar cooperating with said housing to shield said liner from dirt or the like.

2. A joint assembly comprising a housing having an opening at one end, a stud having a headed portion in said housing, a metallic shell about said headed portion and having a collar extending through said opening and provided with a flange overlying an end of the wall of said housing, and a liner of rubber, or like resilient material, within said housing and interposed between said shell and the inner face of the wall of said housing.

3. In a joint assembly which includes a housing open at one end and a stud having a ball-shaped head in the housing, a hollow metallic ball fitted over said head, and a hollow ball of rubber, or the like, fitted over said metallic ball, said metallic ball being provided with an integrally formed collar extending through said rubber ball and adapted to extend through the opening in said housing, said stud being disposed extending through said collar and through the opening in said housing.

RALPH F. PEO.